United States Patent
Qi et al.

(10) Patent No.: US 9,616,862 B2
(45) Date of Patent: Apr. 11, 2017

(54) ACTUATOR FOR AN ELECTRIC PARKING BRAKE SYSTEM

(71) Applicant: Johnson Electric S.A., Murten (CH)

(72) Inventors: Fa Yun Qi, Shenzhen (CN); Li Nan Li, Shenzhen (CN); Jin An Nie, Shenzhen (CN); Rui Feng Qin, Hong Kong (CN)

(73) Assignee: Johnson Electric S.A., Murten (CH)

( * ) Notice: Subject to any disclaimer, the term of this patent is extended or adjusted under 35 U.S.C. 154(b) by 106 days.

(21) Appl. No.: 14/606,591

(22) Filed: Jan. 27, 2015

(65) Prior Publication Data

US 2015/0210253 A1 Jul. 30, 2015

(30) Foreign Application Priority Data

Jan. 27, 2014 (CN) .......................... 2014 1 0041164

(51) Int. Cl.

| | | |
|---|---|---|
| *F16D 65/14* | (2006.01) | |
| *B60T 7/08* | (2006.01) | |
| *B60T 7/12* | (2006.01) | |
| *B60T 13/74* | (2006.01) | |
| *F16D 121/24* | (2012.01) | |

(52) U.S. Cl.
CPC .............. *B60T 7/085* (2013.01); *B60T 7/122* (2013.01); *B60T 13/741* (2013.01); *B60T 13/746* (2013.01); *F16D 2121/24* (2013.01)

(58) Field of Classification Search
CPC .......... F16D 41/04; F16D 66/00; F16D 65/14; F16D 65/18; F16D 2066/003; F16D 2121/24; B60T 13/741; B60T 13/746; B60T 17/221; B60T 7/085; B60T 7/122
See application file for complete search history.

(56) References Cited

U.S. PATENT DOCUMENTS

| | | | |
|---|---|---|---|
| 8,105,200 B2 | 1/2012 | Dettenberger et al. | |
| 8,307,960 B2* | 11/2012 | Seuser .................. | B60T 13/746 188/156 |
| 2007/0151816 A1* | 7/2007 | Gil ........................ | B60T 11/046 188/2 D |
| 2008/0293534 A1* | 11/2008 | Dettenberger ........ | B60T 13/746 475/154 |
| 2009/0050420 A1* | 2/2009 | Poertzgen ............. | B60T 13/746 188/156 |
| 2013/0203554 A1* | 8/2013 | Dettenberger .......... | F16D 65/28 475/343 |
| 2015/0094186 A1* | 4/2015 | Bang ........................ | F16H 3/44 475/280 |

* cited by examiner

*Primary Examiner* — Christopher Schwartz
(74) *Attorney, Agent, or Firm* — Muncy, Geissler, Olds & Lowe, P.C.

(57) ABSTRACT

An actuator for an electric parking brake system has an outer housing. A planetary gear train and an electric motor are disposed in the outer housing. At least one gear connects the motor to the planetary gear train. The planetary gear train comprises a multi-stage planetary gear mechanism. A gear housing accommodates the planetary gear mechanism. The planetary gear train further comprises a centering pin extending through the gear mechanism, such that the planetary gear mechanism rotates about the centering pin. Each stage has a sun gear, a ring gear, a plurality of planet gears meshed with the sun gear and ring gear, and a planet carrier rotatably supporting the planet gears.

15 Claims, 7 Drawing Sheets

ACTUATOR FOR AN ELECTRIC PARKING BRAKE SYSTEM

CROSS REFERENCE TO RELATED APPLICATIONS

This non-provisional patent application claims priority under 35 U.S.C. §119(a) from Patent Application No. 201410041164.9 filed in The People's Republic of China on Jan. 27, 2014, the entire contents of which are hereby incorporated by reference.

FIELD OF THE INVENTION

This invention relates to an electric parking brake system and in particular, to an actuator for use in an electric parking brake system.

BACKGROUND OF THE INVENTION

A parking brake system of a car is used to keep the car motionless when it is parked. The traditional parking brake system is hand-operated and is commonly referred to as the "handbrake". When starting a car equipped with a handbrake on a slope, the driver needs to manually release the handbrake in coordination with the accelerator and clutch (if used). The smooth use of the handbrake in such circumstances requires skill by the driver.

With the development of technology, electric parking brake (EPB) systems have been gradually replacing the traditional mechanical handbrake systems and becoming an important functional component of the car. The EPB system is capable of automatically activating four-wheel braking to prevent the car from rolling when the car is waiting for a green light, the car is parked, the car accidently stalls, or the car key is turned off. When it is desired to move the car from the stationary state, the parking brake is released simply by slightly pressing the accelerator pedal.

The EPB system includes an actuator having a motor driving an output shaft through a speed reduction mechanism. However, the conventional actuator requires tight tolerance component fabrication and is difficult to assemble. Therefore, the conventional actuator has low assembly precision and low operation smoothness and thus can be damaged easily.

SUMMARY OF THE INVENTION

Hence there is a desire for an improved actuator of an electric parking brake system.

Accordingly, in one aspect thereof, the present invention provides an actuator for an electric parking brake system, comprising: an outer housing; a planetary gear train and an electric motor received in the outer housing; and at least one gear connected between the planetary gear train and the electric motor, the electric motor being arranged to drive the planetary gear train through the at least one gear; wherein the planetary gear train comprises a multi-stage planetary gear mechanism, an output driven by the planetary gear mechanism, a gear housing for receiving the planetary gear mechanism, and a gear cover connected to one end of the gear housing, wherein the planetary gear mechanism has a first stage through to a Nth stage that are sequentially meshed from one end to the other end of the planetary gear train, N is an integer greater than 1, each stage of planetary gear mechanism comprises a sun gear, a ring gear, a plurality of planet gears meshed with the sun gear and ring gear, and a planet carrier supporting the planet gears, and the output is fixed to the planet carrier of the Nth stage; and wherein the planetary gear train further comprises a centering pin extending through the planetary gear mechanism, such that stages of the planetary gear mechanism rotate about the centering pin.

Preferably, the at least one gear comprises a first gear to which the sun gear of the first stage of the planetary gear mechanism is fixed, one end of the centering pin is fixed to the sun gear of the first stage of the planetary gear mechanism, and the planet carrier of the Nth stage of the planetary gear mechanism rotates about the other end of the centering pin.

Preferably, one end of the centering pin is fixed to one of the output and the planet carrier of the Nth stage, and the sun gear of the first stage rotates about the other end of the centering pin.

Preferably, the centering pin is not fixed to any part of the planetary gear mechanism.

Preferably, the outer housing of the actuator further comprises a mounting bracket and a top cover, the electric motor is mounted on one side of the mounting bracket, the top cover is connected to another side of the mounting bracket, with the at least one gear being received between the top cover and the mounting bracket; a through hole is defined through the mounting bracket, the at least one gear is aligned with and connected to the gear housing through the through hole, such that the gear housing is received in the through hole.

Preferably, one end of the centering pin is fixed to the top cover and the sun gears and planet carriers of the various stages rotate about the centering pin.

Preferably, a shock absorber is attached around an outer periphery of the mounting bracket.

Preferably, the gear housing comprises N portions, two adjacent ones of which are connected to form a stepped structure, an inner surface of each portion of the gear housing is provided with teeth thereon forming ring gears for meshing with the planet gears of a corresponding stage of the planetary gear mechanism.

Preferably, the gear in the at least one gear that is connected with the planetary gear train is configured to have a hollow structure, the gear is disposed around an outer periphery of an upper portion of the gear housing.

Preferably, the planet carrier of each stage of the planet gear mechanism comprises a plurality of planet pins for rotatably supporting the planet gears, the planet pins are made from metal and are fixed to the corresponding planet carrier in an interference fit manner.

Preferably, the gear cover is connected to the gear housing by a plurality of snap fit connectors.

Preferably, the top cover is connected to the mounting bracket by a plurality of snap fit connectors.

Alternatively or in addition, the top cover is connected to the gear housing by a plurality of snap fit connectors.

In summary, the actuator of the present electric parking brake system utilizes a planetary gear train having a new configuration that is convenient to assemble and has a high load carrying capacity.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
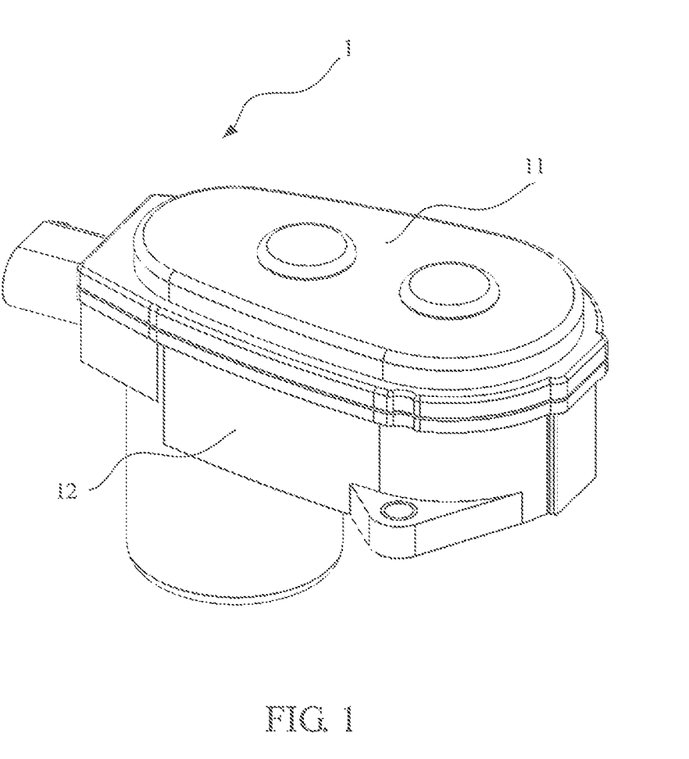
FIG. 1 is an assembled view of an actuator for an electric parking brake system according to the present invention.
Figure 2:
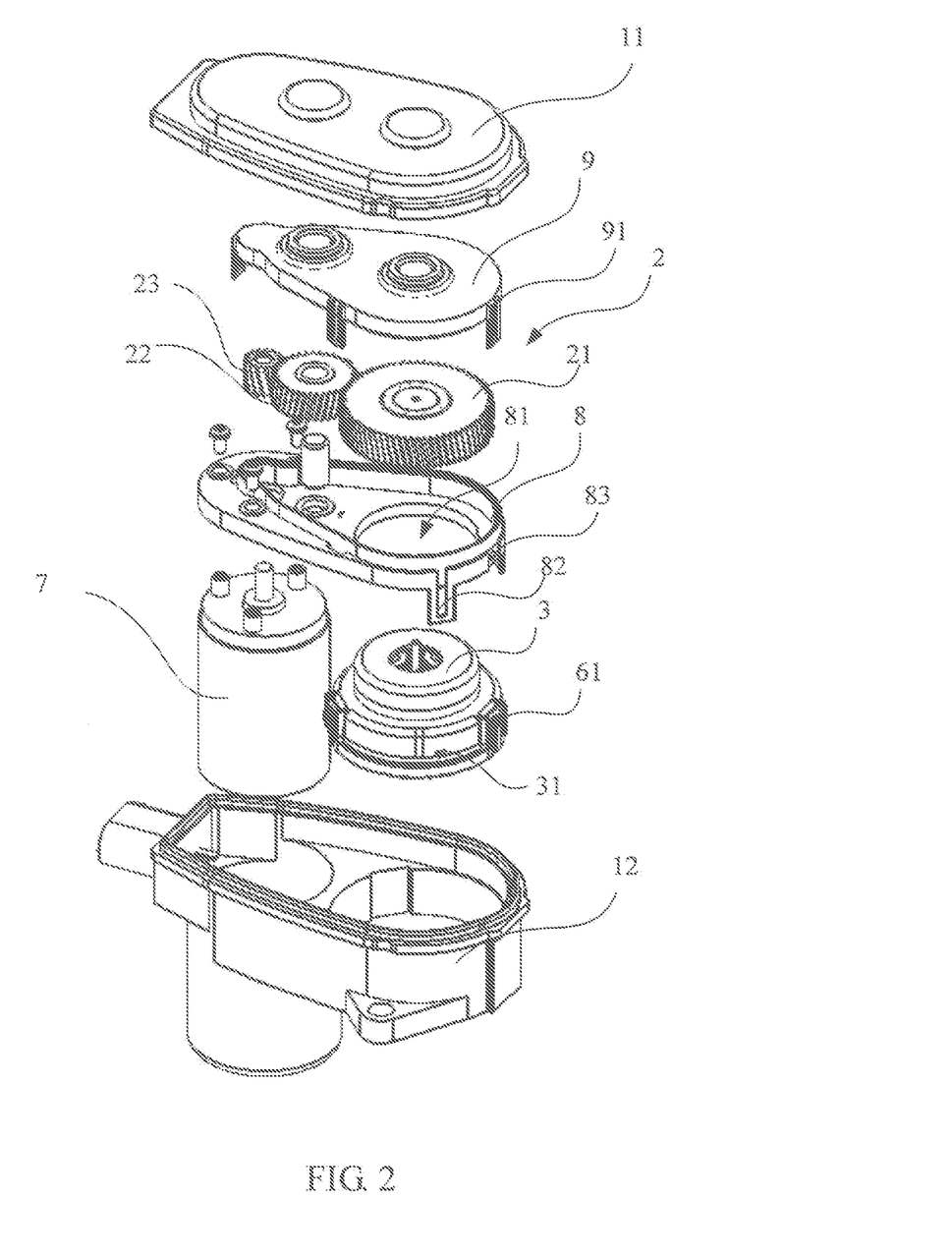
FIG. 2 is an exploded view of the actuator of FIG. 1.
Figure 3:
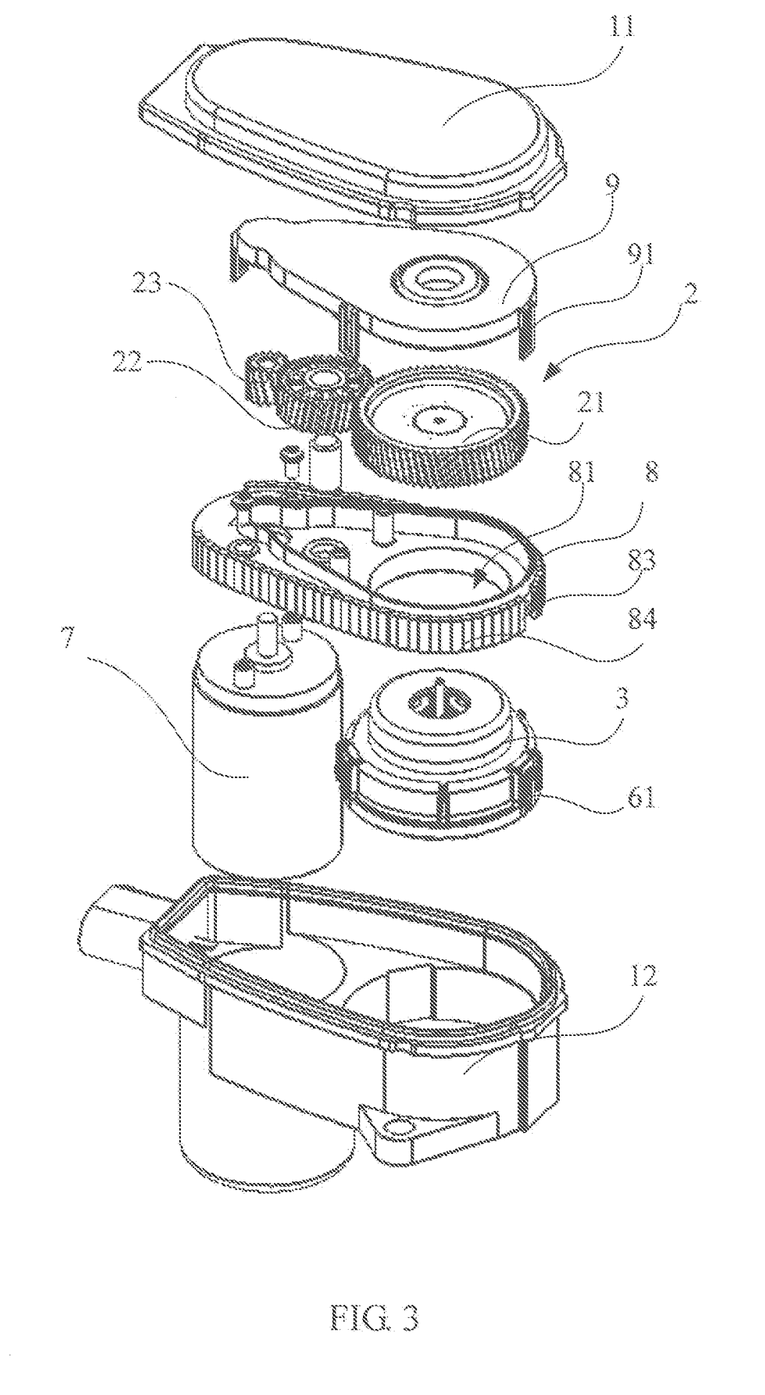
FIG. 3 is exploded view, similar to FIG. 2, of a modified actuator.

Referring to FIGS. 1 to 3, an actuator 1 for an electric parking brake system of the present invention includes an outer housing, an electric motor 7, a planetary gear train, and at least one gear 2. In the present embodiment, the outer housing includes an end cover 11 and a housing body 12 that cooperatively house the electric motor, planetary gear train and at least one gear 2 there between. The at least one gear and the planetary gear train form a speed reduction mechanism connecting the motor to the output of the actuator. The at least one gear 2 includes a first gear 21, a second gear 22, and a third gear 23 that are sequentially meshed. The third gear 23 is fixed to the shaft of the motor. The motor drives the planetary gear train through the sequentially meshed second gear 22 and the first gear 21. Power of the motor is transmitted through the speed reduction mechanism to a parking brake caliper (not shown) to brake the car.

As shown in FIG. 2 and FIG. 3, the outer housing of the actuator 1 further includes a mounting bracket 8 and a top cover 9. The electric motor 7 is mounted to one side of the mounting bracket 8, for example, fastened to the mounting bracket 8 by screws. The top cover 9 is connected to the other side of the mounting bracket 8, with the at least one gear 2 being received between the top cover 9 and the mounting bracket 8. For example, the top cover 9 has catch openings 91, the mounting bracket 8 has corresponding catches 83, and the top cover 9 and the mounting bracket 8 are connected to each other through a snap fit connection between the catch openings 91 and the catches 83. A through hole 81 is defined through the mounting bracket 8.

A gear housing 3 of the planetary gear train is aligned with the first gear 21 through the through hole 81, such that the first gear 21 is connected to the input of the planetary gear train. The gear housing is connected to the same side of the bracket 8 as the motor 7 by snap fit connections. As shown in FIG. 2, the mounting bracket 8 has catch openings 82 and the gear housing 3 has corresponding catches 31, thus forming the snap fit connections.

It is to be understood that other connection methods made be used instead of the snap-fit connections described herein. In addition, as shown in FIG. 3, the gear housing 3 may also be inserted into the through hole 81 from one side of the mounting bracket 8, and directly connected to the top cover 9 such that the gear housing 3 is clamped to the mounting bracket by the top cover 9. Further, a shock absorber 84 may be attached around an outer periphery of the mounting bracket 8 to reduce the noise during operation of the actuator.

Figure 4:
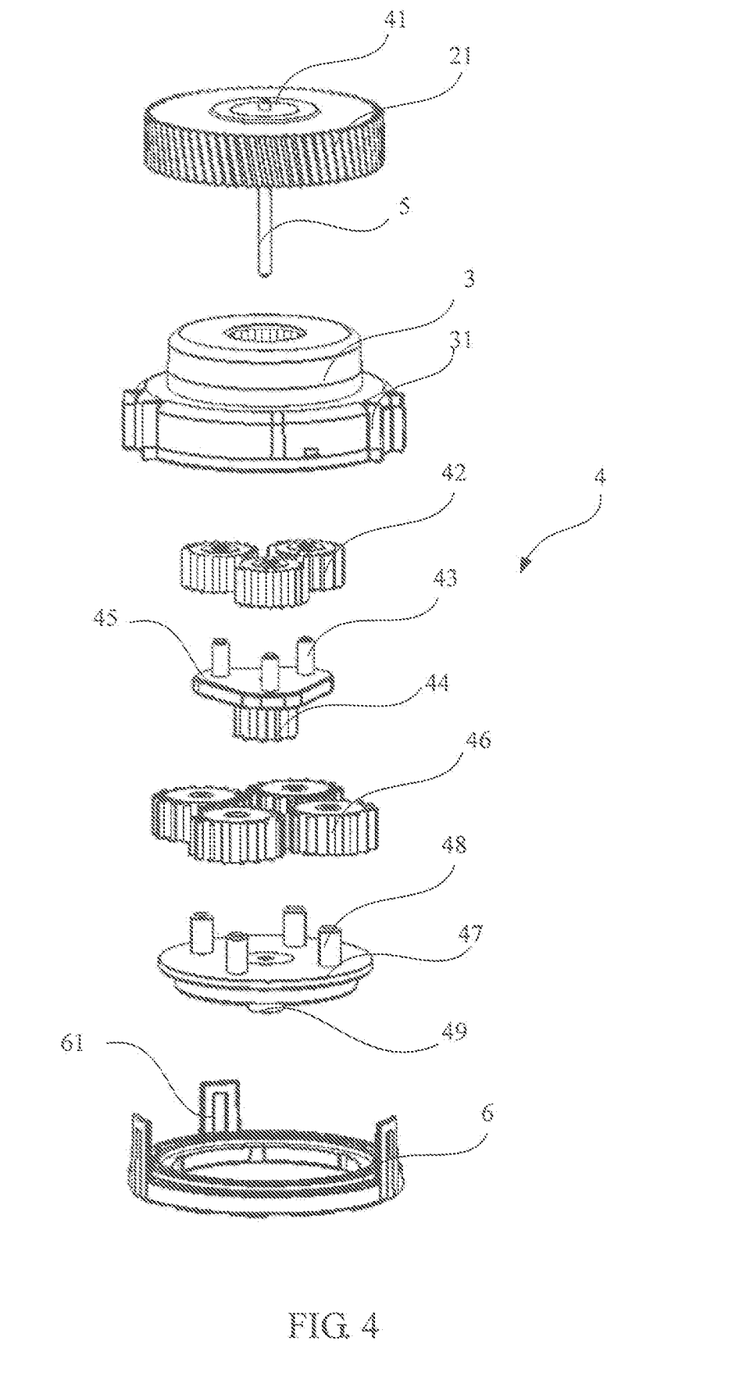
FIG. 4 is an exploded view of a planetary gear train and a first gear according to a first embodiment of the present invention.

A first embodiment of the planetary gear train is shown in FIG. 4. The planetary gear train has multiple stages of planetary gear mechanisms 4, in this example two stages are shown. A gear cap 6 closes an open end of the gear housing 3 to form a gear box housing the planetary gear mechanisms. Each stage of the planetary gear mechanism includes a sun gear, a ring gear, a plurality of planet gears meshed with the sun gear and the ring gear, and a planet carrier supporting the planet gears.

The first sun gear forms the input for the planetary gear train and an output is fixed to the planet carrier of the final stage. The planetary gear train further includes a centering pin 5 extending through the planetary gear train, such that the multiple stages of planetary gear mechanisms 4 rotate about the centering pin 5.

In the embodiment shown, the first sun gear 41 is fixed to or formed as a part of the first gear 21. The first sun gear 41 drives three first planet gears 42 meshed with first ring gear and rotatably supported by first planet pins 43 fixed to a first planet carrier 45. The first ring gear is formed on an inner surface of the gear housing 3. The second sun gear 44 is fixed to the first planet carrier for rotation therewith and drives four second planet gears 46 which are meshed with a second ring gear formed on an inner surface of the gear housing 3. The second planet gears are rotatably supported by second planet pins 48 fixed to a second planet carrier. An output 49 is fixed to the second planet carrier 47 for rotation therewith. The output 49 may be in the form of an output shaft or an output cog, depending on application requirements. The gear housing 3 is stepped to provide a larger diameter second ring gear for the second stage of the planetary gear train. The planet pins 43 and 48, are made from metal, and are fixed to their respective planet carrier 45, 47, by being inserted into holes therein in an interference fit manner.

It is noted that the centering pin 5 sequentially passes through the first and second stages of planetary gear train. One end of the centering pin 5 is fixed to the first sun gear 41. The other end of the centering pin 5 is inserted into a guide hole in the second planet carrier 47, with clearance, such that the first planet carrier and the second planet carrier both rotate about the centering pin 5.

Preferably, the gear cover 6 and the gear housing 3 are connected to each other via a plurality of snap fit structures each including a catch opening and a catch for engaging with the catching opening. For example, as shown in FIG. 4, the gear cover 6 forms three catch openings 61 at an periphery thereof, the gear housing 3 includes three corresponding catches 31 formed at an periphery thereof. It is to be understood that the number of snap fit connectors may vary but at least two connectors is considered desirable with three or four connectors being preferred.

Figure 5:
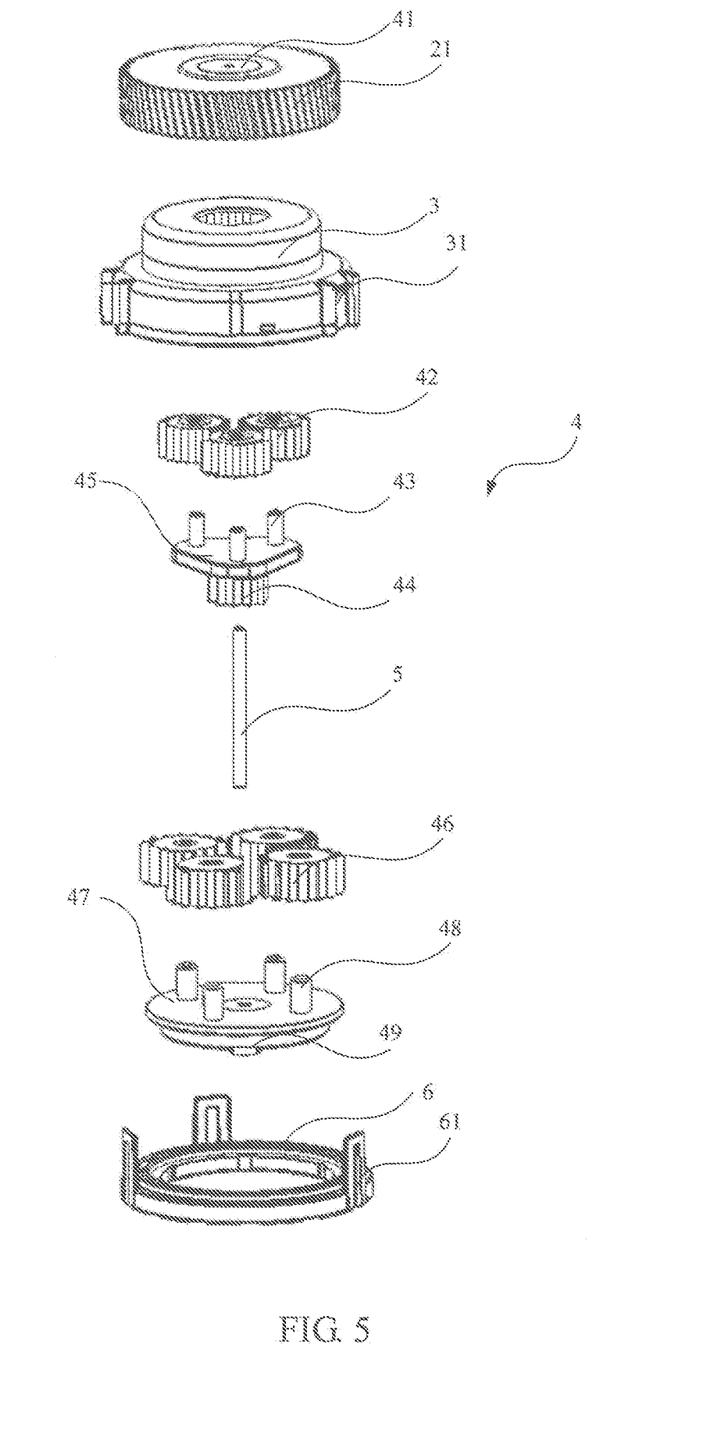
FIG. 5 is an exploded view of a planetary gear train and a first gear according to a second embodiment of the present invention.

A second embodiment of the planetary gear train is shown in FIG. 5. The configuration of the second embodiment is substantially the same as that of the first embodiment, except that the centering pin 5 is not fixed to any part of the planetary gear train 4. Rather, the centering pin 5 passes through the first stage of planetary gear mechanism and the second stage of planetary gear mechanism. One end of the centering pin 5 is located in the first sun gear 41 and the other end of the centering pin is located in the second planet carrier 47. However, the pin is floating meaning that the first sun gear 41, the first planet carrier 45, and the second planet carrier 47 can all freely rotate about the centering pin 5.

Figure 6:
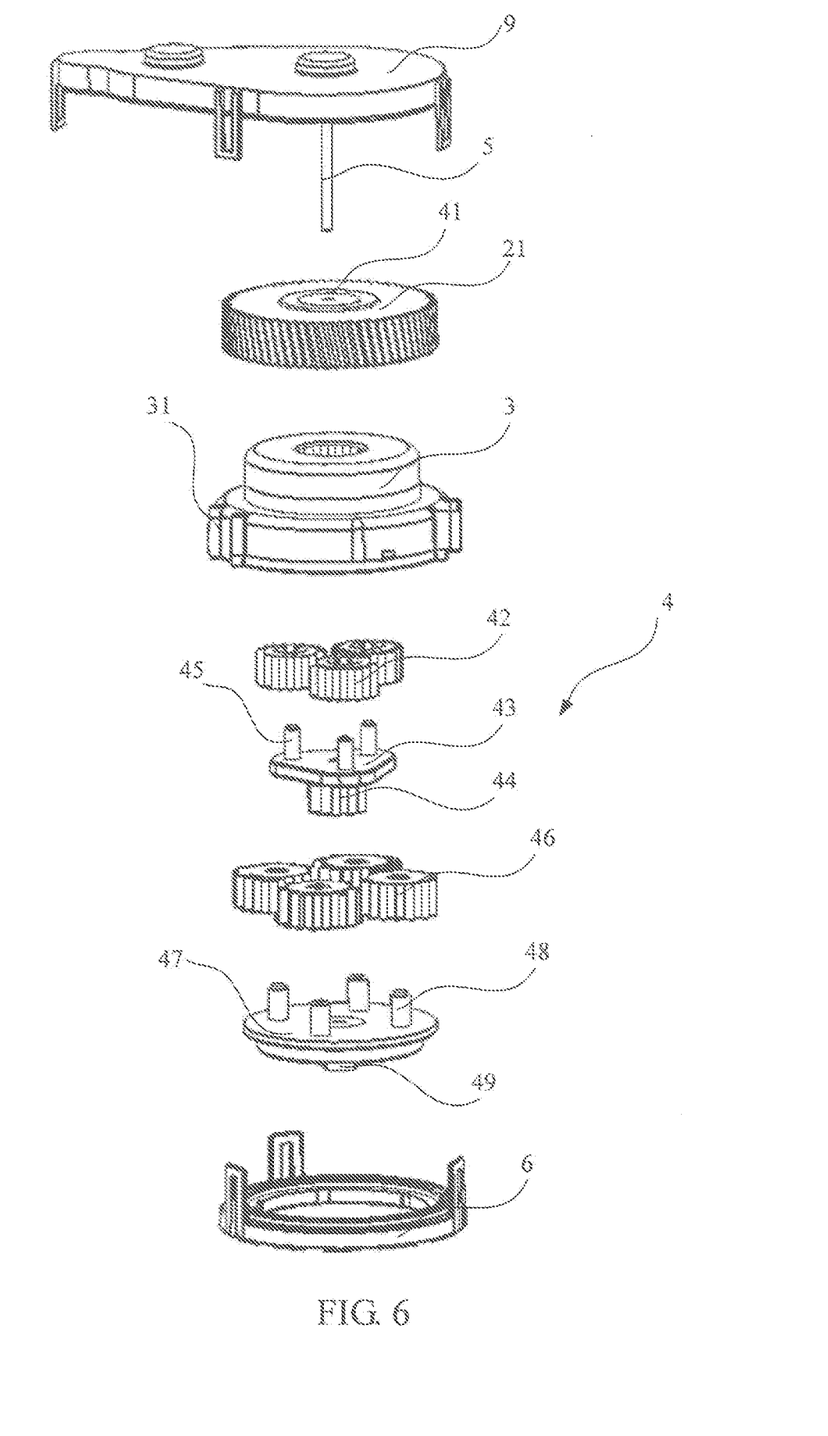
FIG. 6 is an exploded view of a planetary gear train and a first gear according to a third embodiment of the present invention.

A third embodiment of the planetary gear train is shown in FIG. 6. The configuration of the third embodiment is substantially the same as that of the second embodiment, except that the centering pin 5 is fixed to the top cover 9. Thus in this embodiment the centering pin 5 is not floating but the first sun gear 41, the first planet carrier 45, and the second planet carrier 47 can all freely rotate about the centering pin.

Figure 7:
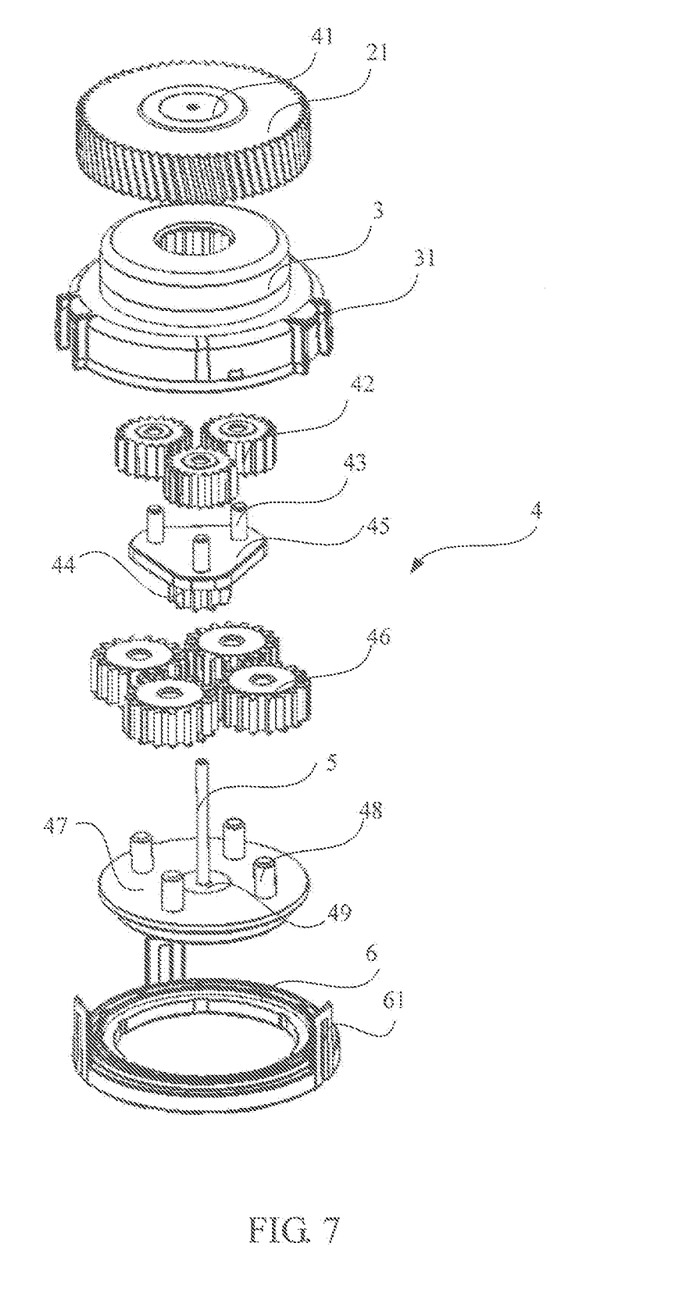
FIG. 7 is an exploded view of a planetary gear train and a first gear according to a fourth embodiment of the present invention.

A fourth embodiment of the planetary gear train is shown in FIG. 7. The configuration of the fourth embodiment is substantially the same as that of the first embodiment, except that the centering pin 5 is fixed to the second planet carrier 47 or the output 49. In the embodiment of FIG. 7, the output 49 is an output cog which is fixed to the second planet carrier 47 by being pressed into a central hole in the second planet carrier in an interference manner. The centering pin 5 is pressed into a central hole in the output cog and is fixed therein by an interference fit. Thus the centering pin is fixed to both the output 49 and the second planet carrier 47. Thus in this embodiment the first sun gear 41 and the first planet carrier 45 can freely rotate about the centering pin while the second planet carrier 47 and the output 49 rotate with the centering pin. The first gear 21, by virtue of its connection with the first sun gear 41, also rotates about the centering pin 5. Alternatively, as mentioned previously, output 49 may be an output shaft.

With the centering pin 5 fixedly mounted to the output shaft 49, all components may be assembled sequentially from the output shaft toward the first-stage sun gear 41, which facilitates the assembly of the actuator.

In addition, in various configurations described above, the centering pin 5 passes through the central hole of the intermediate-stage planet carriers (e.g. the first planet carrier 45) in a clearance fit manner, which facilitates reducing the fabrication precision of the powder metallurgy planet carrier. Furthermore, when the centering pin 5 is fixed to a low speed stage gear, the relative speed between the centering pin 5 and the axial bearing in the top cover 9 is reduced, which facilitates reducing wear. Moreover, with one end of the centering pin 5 being fixed, each stage of gear may be assembled sequentially from the fixed end of the centering pin 5, which facilitates ensuring the assembly precision and smooth transmission.

Further, the gear of the at least one gear 2 of the first to fourth embodiments that is connected with the multi-stage of planetary gear, i.e. the first gear 21 that is connected with the first sun gear, may be configured to have a hollow structure (not shown), such that the gear is disposed around an outer periphery of an upper portion of the gear housing 3.

In the description and claims of the present application, each of the verbs "comprise", "include", "contain" and "have", and variations thereof, are used in an inclusive sense, to specify the presence of the stated item or feature but do not preclude the presence of additional items or features.

It is to be appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An actuator for an electric parking brake system, comprising:
   an outer housing;
   a planetary gear train and an electric motor received in the outer housing; and
   at least one gear connected between the planetary gear train and the electric motor, the electric motor being arranged to drive the planetary gear train through the at least one gear;
   wherein the planetary gear train comprises a multi-stage planetary gear mechanism, an output driven by the planetary gear mechanism, a gear housing for receiving the planetary gear mechanism, and a gear cover connected to one end of the gear housing, wherein the planetary gear mechanism has a first stage through to a Nth stage that are sequentially meshed from one end to the other end of the planetary gear train, N is an integer greater than 1, each stage of planetary gear mechanism comprises a sun gear, a ring gear, a plurality of planet gears meshed with the sun gear and ring gear, and a planet carrier supporting the planet gears, and the output is fixed to the planet carrier of the Nth stage; and
   wherein the planetary gear train further comprises a centering pin extending through the planetary gear mechanism, such that stages of the planetary gear mechanism rotate about the centering pin; and
   wherein the centering pin is fixed to the sun gear of the first stage of the planetary gear mechanism or one of the output and the planet carrier of the Nth stage.

2. The actuator of claim 1, wherein the outer housing of the actuator further comprises a mounting bracket and a top cover, the electric motor is mounted on one side of the mounting bracket, the top cover is connected to another side of the mounting bracket, with the at least one gear being received between the top cover and the mounting bracket; a through hole is defined through the mounting bracket, the at least one gear is aligned with and connected to the gear housing through the through hole, such that the gear housing is received in the through hole.

3. The actuator of claim 2, wherein a shock absorber is attached around an outer periphery of the mounting bracket.

4. The actuator of claim 2, wherein the top cover is connected to the mounting bracket by a plurality of snap fit connectors.

5. The actuator of claim 2, wherein the top cover is connected to the gear housing by a plurality of snap fit connectors.

6. The actuator of claim 1, wherein the gear housing comprises N portions, two adjacent ones of which are connected to form a stepped structure, an inner surface of each portion of the gear housing is provided with teeth thereon forming ring gears for meshing with the planet gears of a corresponding stage of the planetary gear mechanism.

7. The actuator of claim 6, wherein the gear in the at least one gear that is connected with the planetary gear train is configured to have a hollow structure, the gear is disposed around an outer periphery of an upper portion of the gear housing.

8. The actuator of claim 1, wherein the at least one gear comprises a first gear to which the sun gear of the first stage of the planetary gear mechanism is fixed, one end of the centering pin is fixed to the sun gear of the first stage of the planetary gear mechanism, and the planet carrier of the Nth stage of the planetary gear mechanism rotates about the other end of the centering pin.

9. The actuator of claim 1, wherein one end of the centering pin is fixed to one of the output and the planet carrier of the Nth stage, and the sun gear of the first stage rotates about the other end of the centering pin.

10. The actuator of claim 1, wherein the planet carrier of each stage of the planet gear mechanism comprises a plurality of planet pins for rotatably supporting the planet gears, the planet pins are made from metal and are fixed to the corresponding planet carrier in an interference fit manner.

11. The actuator of claim 1, wherein the gear cover is connected to the gear housing by a plurality of snap fit connectors.

12. An actuator for an electric parking brake system, comprising:
   an outer housing;
   a planetary gear train and an electric motor received in the outer housing; and
   at least one gear connected between the planetary gear train and the electric motor, the electric motor being arranged to drive the planetary gear train through the at least one gear;
   wherein the planetary gear train comprises a multi-stage planetary gear mechanism, and a centering pin extending through the planetary gear mechanism, such that stages of the planetary gear mechanism rotate about the centering pin;
   wherein the outer housing of the actuator further comprises a mounting bracket and a top cover, the top cover is connected the mounting bracket, the at least one gear is received between the top cover and the mounting bracket; and
   wherein the centering pin is fixed to the top cover.

13. The actuator of claim 12, wherein the planetary gear train further comprises an output driven by the planetary gear mechanism, a gear housing for receiving the planetary gear mechanism, and a gear cover connected to one end of the gear housing, wherein the planetary gear mechanism has a first stage through to a Nth stage that are sequentially meshed from one end to the other end of the planetary gear train, N is an integer greater than 1, each stage of planetary gear mechanism comprises a sun gear, a ring gear, a plurality of planet gears meshed with the sun gear and ring gear, and a planet carrier supporting the planet gears, and the output is fixed to the planet carrier of the Nth stage.

14. The actuator of claim 13, wherein a through hole is defined through the mounting bracket, the at least one gear is aligned with and connected to the gear housing through the through hole, such that the gear housing is received in the through hole.

15. An actuator for an electric parking brake system, comprising:
   an outer housing;
   a planetary gear train and an electric motor received in the outer housing; and
   at least one gear connected between the planetary gear train and the electric motor, the electric motor being arranged to drive the planetary gear train through the at least one gear;
   wherein the planetary gear train comprises a multi-stage planetary gear mechanism and an output driven by the planetary gear mechanism, wherein the planetary gear mechanism has a first stage through to a Nth stage that are sequentially meshed from one end to the other end of the planetary gear train, N is an integer greater than 1, each stage of planetary gear mechanism comprises a sun gear, a ring gear, a plurality of planet gears meshed with the sun gear and ring gear, and a planet carrier supporting the planet gears, and the output is fixed to the planet carrier of the Nth stage;
   wherein the planetary gear train further comprises a centering pin extending through the planetary gear mechanism, such that stages of the planetary gear mechanism rotate about the centering pin; and
   Wherein the centering pin is fixed to the sun gear of the first stage of the planetary gear mechanism or one of the output and the planet carrier of the Nth stage.

* * * * *